United States Patent [19]

Neill

[11] Patent Number: 4,671,324
[45] Date of Patent: * Jun. 9, 1987

[54] JACK BOLT ASSEMBLY

[76] Inventor: David C. Neill, P.O. Box EE, Anahuac, Tex. 77514

[ * ] Notice: The portion of the term of this patent subsequent to Sep. 10, 2002 has been disclaimed.

[21] Appl. No.: 759,589

[22] Filed: Jul. 26, 1985

Related U.S. Application Data

[63] Continuation-in-part of Ser. No. 413,883, Sep. 1, 1982, Pat. No. 4,540,199.

[51] Int. Cl.⁴ ............................................... F16L 55/10
[52] U.S. Cl. ...................................... 138/44; 138/94.3; 285/12; 285/27; 285/39; 285/50; 285/363
[58] Field of Search ................. 403/16, 21, , 335, 336, 403/337, 19; 285/363, 405, 18, 24, 412, 27, 368, 50, 39, 330, 12; 29/239, 256, 263–265; 411/396, 402, 410, 412, 378; 138/94, 94.3, 94.5, 44

[56] References Cited

U.S. PATENT DOCUMENTS

| | | | |
|---|---|---|---|
| 764,603 | 7/1904 | Lambert | 285/DIG. 7 |
| 1,707,870 | 4/1929 | Morton | |
| 1,766,623 | 6/1930 | Frey | 285/363 X |
| 1,852,521 | 4/1932 | Hill | |
| 2,393,795 | 1/1946 | Miller | |
| 2,595,787 | 5/1952 | Heimann | 285/321 X |
| 2,654,569 | 10/1953 | Cooper | |
| 3,620,554 | 11/1971 | Ward et al. | 285/363 X |
| 3,711,920 | 1/1973 | Simmons | |
| 3,749,426 | 7/1973 | Tillman | 285/363 X |
| 3,997,957 | 12/1976 | Tone et al. | |
| 4,015,324 | 4/1977 | Lutter | |
| 4,027,373 | 6/1977 | Kwast et al. | |
| 4,092,236 | 5/1978 | Sato et al. | 285/337 |
| 4,209,177 | 6/1980 | Hull | 285/368 |
| 4,310,181 | 1/1982 | Welsh et al. | 285/39 X |
| 4,343,332 | 8/1982 | Williams et al. | 138/94.3 |
| 4,540,199 | 9/1985 | Neill | 285/27 |

FOREIGN PATENT DOCUMENTS 496292 10/1950 Belgium ............................... 411/378

Primary Examiner—Dave W. Arola
Attorney, Agent, or Firm—Glaser, Griggs & Schwartz

[57] ABSTRACT

A jack bolt assembly for separating joined first and second flange members of a flange assembly including a longitudinally extending, generally rod-shaped jack bolt member adapted to extend between first and second flange members of the flange assembly and a thrust member, the jack bolt member having a primary threaded portion for threadedly engaging at least one of the openings formed in the first flange member, a radial engaging surface, and a thrust member receiving portion in axial alignment with the primary threaded portion, the thrust member mounted with the thrust member receiving portion and between the first and second flange members for separating the flange members of the flange assembly upon rotation of the jack bolt member with respect to the first flange member of the flange assembly. The jack bolt assembly further includes an improved tool engaging adapter for removable mounting with the jack bolt member.

12 Claims, 4 Drawing Figures

JACK BOLT ASSEMBLY

CROSS REFERENCE TO RELATED APPLICATIONS

This application is a continuation-in-part of U.S. patent application Ser. No. 413,883, filed on Sept. 1, 1982 now U.S. Pat. No. 4,540,199 issued Sept. 10, 1985.

FIELD OF THE INVENTION

The field of this invention relates to devices utilized in conjunction with flowline flanges, particularly of the type used in securing flange members together as well as used in separating the mating flanges.

BACKGROUND OF THE INVENTION

Mating flanges that have been tightly secured together have historically posed difficulties in their disassembly. Typically, mating flanges having a plurality of aligned openings for receiving bolts and the like, after being tightly assembled for periods of time, pose service difficulties in the bolt removal-flange separation process. Some systems are of a construction too light to handle the necessary loads for separating the joined flanges when release is desired, while others provide no support or alignment capabilities during the separating phase of the mating flange portions.

Efforts have been made to separate various types of flanges and include those such as taught in U.S. Pat. Nos. 1,707,870; 1,852,521; 2,393,795; 2,654,569; 3,711,920; and, 3,997,957. Some devices of the prior art such as disclosed in U.S. Pat. No. 4,027,373, teach the use of devices which can be used both as a flange bolt and as a flange spreader. Furthermore, U.S. Pat. No. 4,015,324 discloses a device for separating flange pipes using a cammed, threaded bolt arrangement. Other types of devices have included those wherein one of the mating faces of a pair of flanges has a threaded opening machined therein to receive a threaded member, not aligned with the openings for fastening the flange together. This threaded opening permits a threaded bolt to engage a nut mounted in a countersunk opening formed in the mating flange face for use in separating the mating flange members.

However, so far as known, no flange separating device that remains in service as a fastener for the flange, serves double duty as a jack bolt for separating the flange members, while providing both support and alignment of the flanges while the separating flanges are forced apart. The support and alignment of the flanges during the separation of the mating flanges is important to prevent twisting and slipping of opposing flange faces with respect to one another while reducing the risk of damage to the flange yet requiring a minimum of tools and time to accomplish same. Further, so fasr as known, no jack bolt member incorporates the use of a replaceable tool engaging adapter which allows reuse of the jack bolt, despite the damage to the tool engaging end thereof.

SUMMARY OF THE INVENTION

The present invention relates to a new and improved jack bolt assembly for separating first and second flange members of a releasably secured flange assembly including a jack bolt member extending between the flange members of the flange assembly. The jack bolt member is of a longitudinally extending generally rod-shaped configuration and includes a primary threaded portion for threadedly engaging one of the openings in the first flange member, a radial engaging surface formed adjacent to the primary threaded portion, a thrust member receiving portion formed adjacent to the threaded portion and axially aligned therewith, with the thrust member receiving portion partially extending into the aligned opening formed in the second flange member of the flange assembly. The jack bolt assembly further includes a thrust member movably mounted with the thrust member receiving portion for abutting the radial engaging surface and second flange member upon initial rotation of the primary threaded portion, the engagement of the thrust member with the second flange member for separating the first and second flange members of the flange assembly upon continued rotation of the primary threaded portion. The jack bolt assembly further includes an improved tool engaging adapter for removable mounting with the tool engaging end of the primary threaded portion.

DESCRIPTION OF A PREFERRED EMBODIMENT

In the drawings, the jack bolt assembly of the present invention is designated generally by the letter A. The jack bolt assembly A is adapted to be used in conjunction with a flange assembly F, with the jack bolt assembly A including a jack bolt member J and a thrust member M. The jack bolt member J further includes a primary threaded portion P, a radial engaging surface R and a thrust member receiving portion T for receiving the thrust member M. Unless otherwise specified, it is preferred that the jack bolt assembly A of the present invention be formed of suitable high strength material such as stainless steel and the like, all capable of withstanding the typically high tension and compressive forces along with an ability to withstand adverse environmental conditions typically encountered in use with flange assemblies.

Figure 1A:
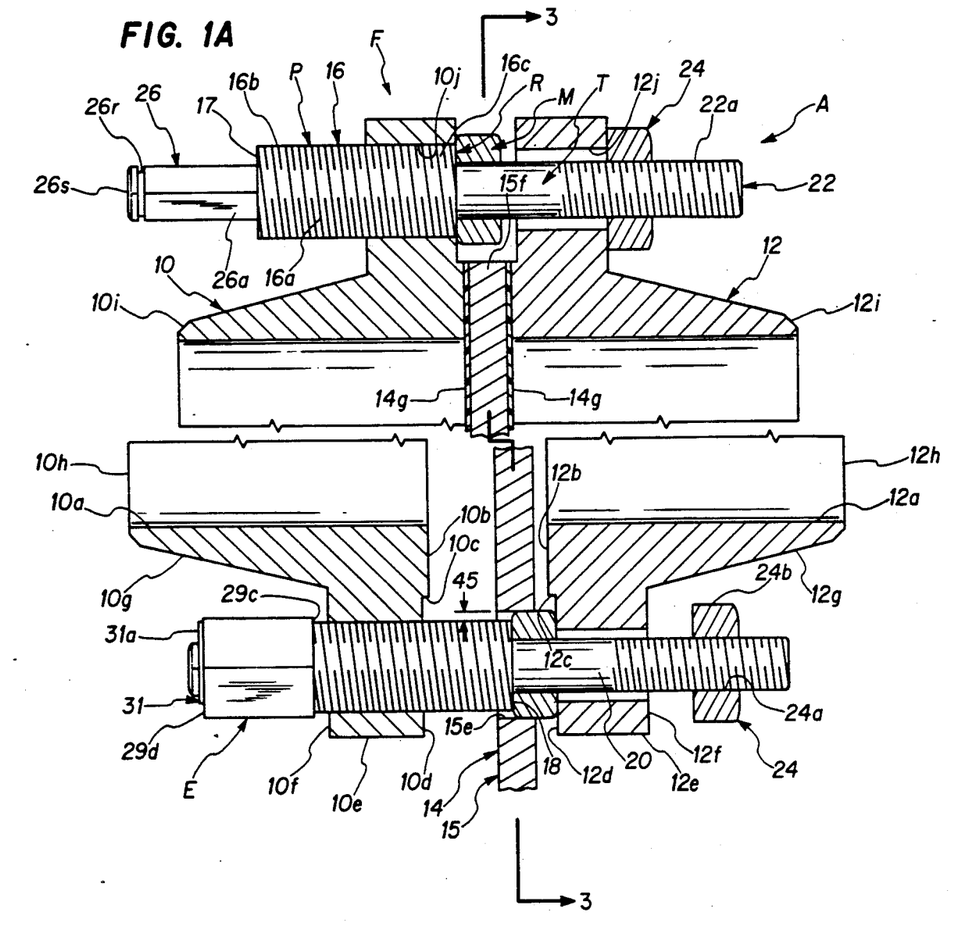
FIG. 1A is a sectional, elevational view, showing the flange members of a flange assembly having been secured together by use of the jack bolt assembly of the present invention showing the spectacle blind in place.
Figure 1B:
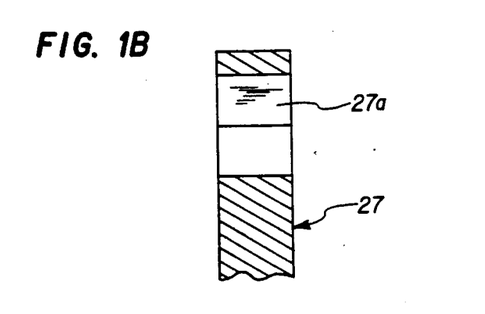
FIG. 1B is a sectional, elevational view, similar to FIG. 1A, showing the jack bolt assembly of FIG. 1A as used in separating the flange members of the flange assembly, showing the spectacle blind in place.
Figure 3:
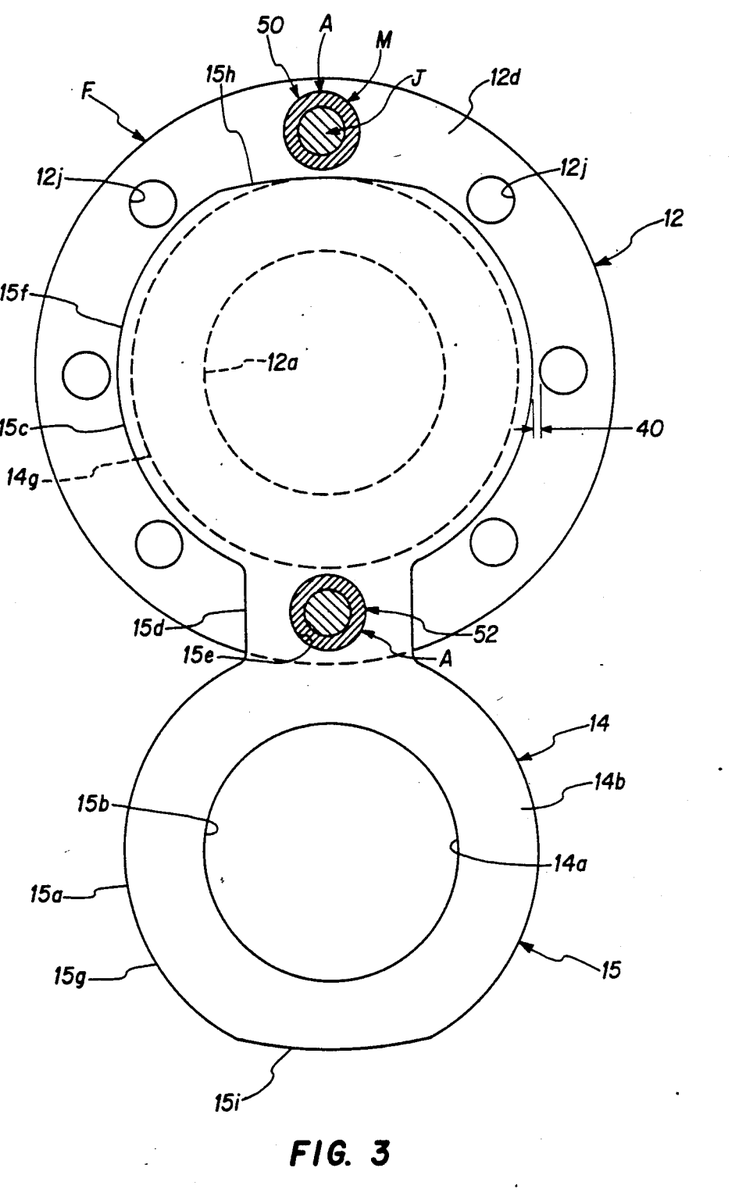

The jack bolt assembly A of the present invention is adapted to be used for separating a releasably secured flange assembly F. The flange assembly F as generally depicted in FIGS. 1A, 1B and 3, typically includes a first flange member 10 and a second member 12. Typically, the first and second flange member 10, 12, are formed having aligned bores 10a, 12a that are adapted to be in substantial axial alignment with one another when the first and second flange members 10, 12, are formed having aligned bores 10a, 12a that are adapted to be releasably secured with the jack bolt assembly A of the present invention, such that the mating radial surfaces 10b, 12b, respectively, are adapted either to engage one another directly upon proper make-up between the first and second flange members 10, 12 of the flange assembly F or, as depicted in the drawings, a suitable member 14 may be disposed therebetween.

The member 14 may be formed having a bore 14a (FIG. 3) that is adapted to be axially aligned with bores 10a, 12a of the first and second flange members 10, 12, respectively, and with an annular portion 14b adapted to be disposed between the mating radial surfaces 10b, 12b of the first and second flange members 10, 12. As shown in FIG. 3, the member 14 includes spectacle blind 15 which includes an open flowline blind portion 15a having a bore 15b, a flowline closing blind portion 15c, and a neck portion 15d formed having an opening 15e centrally thereof, as discussed more fully hereinbelow. It should be appreciated that the spectacle blind 15 may be of any suitable type material such as stainless steel, carbon steel, aluminum or of any other suitable material. The member 14 may further include a gasket 14g, a slip blind, a steaming blind or any other type of structure that is adapted to be installed between the opposing mating radial surfaces 10b, 12b of flange members 10, 12 of the flange assembly F. The member 14 may also include valves of any type and variety or any other types of structures typically found to be mountable with and between the flange members 10, 12 of flange assembly F. The flange members 10, 12 may be either of a ring type joint or of a raised face type, with the ring type joint using ring gaskets or lap joints.

The flange member 10, 12 typically are formed having an inner annular surface 10c, 12c formed adjacent to mating radial surfaces 10b, 12b, respectively, with inner radial flange ring surfaces 10d, 12d formed adjacent to the inner annular surfaces 10c, 12c, respectively. Outer annular surfaces 10e, 12e are formed adjacent to the inner radial flange ring surfaces 10d, 12d, with outer radial flange ring surfaces 10f, 12f formed adjacent to the outer annular surfaces 10e, 12e, respectively, and substantially parallel with the inner radial flange ring surfaces 10d, 12d. Typically the housings 10g, 12g of the first and second flange members 10, 12, respectively, are adapted to be mounted with a suitable flowline (not shown) adjacent ends 10h, 12h by typical weldments at weldment portions 10i, 12i or by any other suitable means.

Accordingly, the first flange member 10 would be connected with an appropriate flowline (not shown) and the second flange member 12 would be connected to an appropriate flowline (not shown), with the flowlines connected with the first and second flange members 10, 12 thus being joined by proper make-up of the flange assembly F. Preferably, the first and second flange members 10, 12 are formed having a plurality of openings 10j, 12j with the openings 10j, 12j adapted to be axially aligned with one another such that for each opening 10j formed in the first flange member 10, a corresponding axially aligned opening 12j is formed in the second flange member 12. Preferably, the openings 10j, 12j are formed substantially parallel with the bores 10a, 12a and extend between the inner and outer radial flange ring surfaces 10d, 12d, 10f, 12f, respectively. To the extent that the flange assembly F is joined together and made up by conventional bolt and nut assemblies (not shown), the openings 10j, 12j may be of the same diameter. However, as discussed more fully hereinbelow, the extent that the openings 10j, 12j are adapted to receive the jack bolt assembly A of the present invention such may not be the case.

The jack bolt assembly A of the present invention is adapted to be used for separating the joined first and second flange members 10, 12 of the releasably secured flange assembly F. The jack bolt assembly A includes a jack bolt member J which is adapted to extend between the first and second flange members 10, 12 of the flange assembly F. As best seen in FIG. 3, preferably, the jack bolt member J is of a longitudinally extending, generally rod-shaped configuration and has generally, a primary threaded portion P, a radial engaging surface R, and a thrust member receiving portion T. The primary threaded portion P of the jack bolt member J includes a threaded portion 16 formed having a plurality of threads 16a formed on the outer annular surface thereof, with the threads 16a extending from and between the first end 16b and the second 16c. The radial engaging surface R is formed adjacent to the primary threaded portion P such that the radial engaging surface R includes radial surface 18 formed adjacent to the second end 16c of the threaded portion 16 of the primary threaded portion P. Preferably the radial engaging surface R extends radially inwardly from the primary threaded portion P.

The jack bolt member J further includes a thrust member receiving portion T which includes receiving portion 20 which is formed adjacent to the primary threaded portion P and radial engaging surface R. Preferably, the thrust member receiving portion T is axially aligned with the primary threaded portion P. A secondary threaded portion 22 is preferably formed adjacent and in axial alignment with the thrust member receiving portion T and is preferably formed having a plurality of threads 22a formed about the outer annular surface thereof. A securing member 24 is adapted to threadedly engage the threads 22a of the secondary threaded portion 22 by means of compatibly formed threads 24a formed therewith. The securing member 24 may include any type suitable nut or the like.

Figure 2:
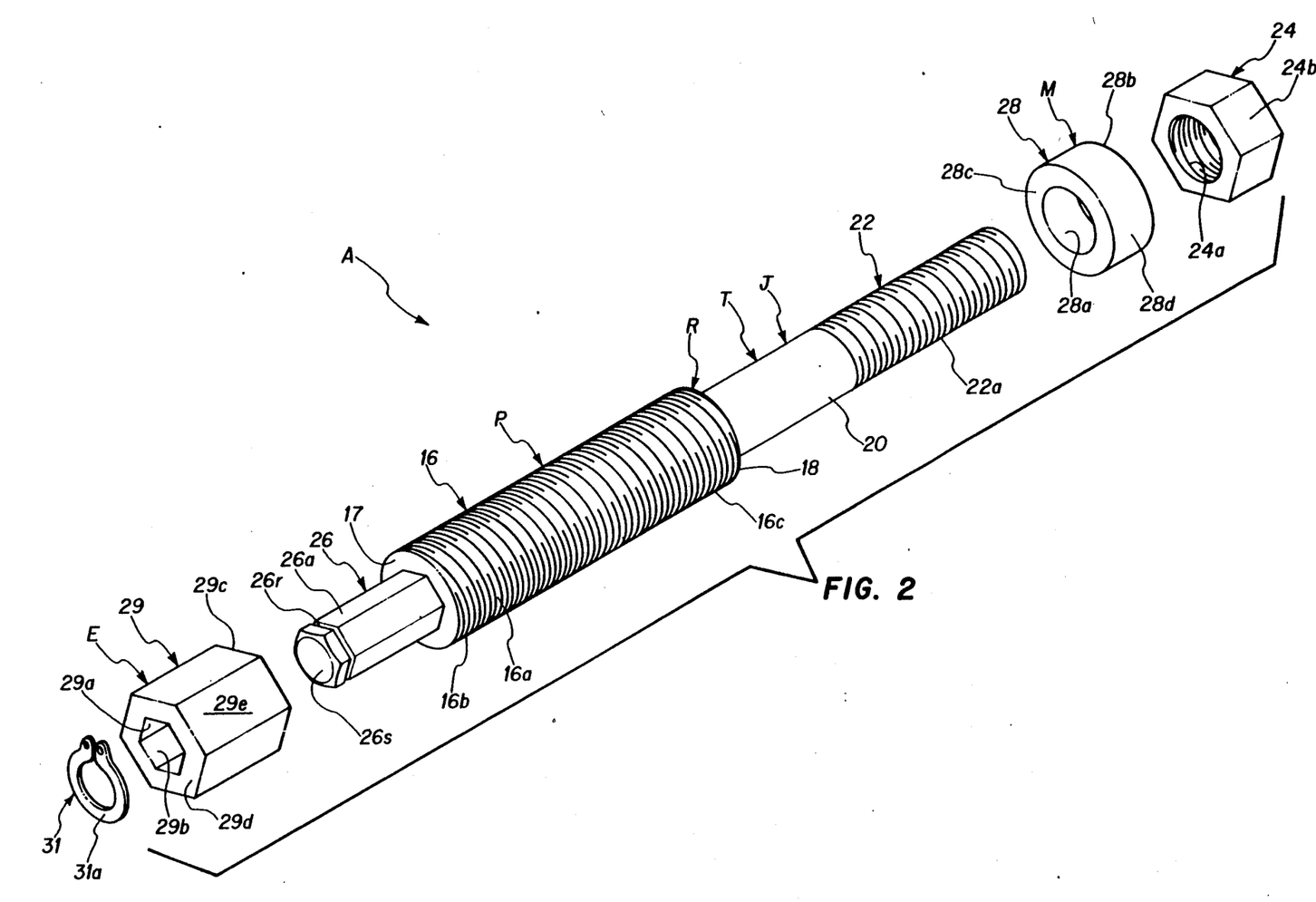
FIG. 2 shows an isometric, exploded view of the jack bolt assembly of the present invention; and, FIG. 3 shows a partially sectional end view of the jack bolt assembly of the present invention with an end view of a flange member of the flange assembly as used with a spectacle blind, taken along the lines 3—3 of FIGS. 1A and 1B.

The jack bolt member J of the present invention further includes a tool engaging end, designated generally as 26, formed with the primary threaded portion P and in axial alignment therewith for enhanced ease of rotation of the jack bolt member J as discussed more fully hereinbelow. As shown in FIGS. 1-3, the tool engaging end 26 may be formed of a configuration compatible with a tool 27 (FIG. 1B) to be used for rotation of the jack bolt member J by engagement of the tool faces 27a of the tool 27 with the tool engaging end 26. As best seen in FIG. 2, the outer surface configuration of the tool engaging end 26 is that of a multiple-sided figure having sides 26a. The sides 26a may form any suitable end view cross-sectional configuration such as that of a triangle, square, rectangle, hexagon or any other suitable configuration that is desired, with the tool faces 27a being compatibly formed to engage such sides 26a of the tool engaging end 26. The tool engaging end 26 may also include an annular recess 26r formed adjacent end portion 26s.

The jack bolt assembly A of the present invention further includes a tool engaging adapter E to be mounted with the jack bolt assembly A adjacent the tool engaging end 26. Preferably, the tool engaging adapter E includes adapter 29 having a geometric bore 29a formed of side portions 29b. Preferably, the side portion 29b of bore 29a are sized to compatibly engage sides 26a of the tool engaging end 26 for mounting of the tool engaging adapter E with the jack bolt assembly A. When properly position with the jack bolt member J, the end surface 29c of adapter 29 abutts radial surface 17 formed between threaded portion 16 and tool engaging end 26, with end surface 29d being in close proximity to recess 26r. An adapter securing member 31, such as snap ring 31a, is preferably mounted with recess 26r for securing the tool engaging adapter E with the jack bolt member J. As discussed more fully hereinbelow, the exterior annular surface 29e, in configuration and in cross-sectional radial dimension, preferably is substantially the same as the exterior annular surface 24b of the securing member 24. Preferably, when the adapter 29 is properly positioned onto the tool engaging end 26, any rotational inputs by tool 27 acting upon the tool engaging adapter E will result in rotation of the jack bolt member J.

The jack bolt assembly A of the present invention further includes a thrust member M movably mounted with the thrust member receiving portion T, with the thrust member M adapted to be disposed between the first and second flange members 10, 12 of the flange assembly F. As best seen in FIG. 2, the thrust member M includes a thrust bushing 28 formed having a bore 28a, radial surfaces 28b, 28c and an outer annular surface 28d. Alternatively, the thrust member M may include a thrust bearing (not shown). Preferably, the thrust bushing 28 is adapted to be disposed about the thrust member receiving portion T of the jack bolt member J such that bore 28a of the thrust bushing 28 is adapted to be receivably mounted about the receiving portion 20. The thrust member M is in a location between the flange members 10, 12 that provides ease of access for lubrication thereof during separating operations, as is necessary.

In the use or operation of the jack bolt assembly A of the present invention, it is contemplated that the first and second flange members 10, 12 of the flange assembly F are secured together by a plurality of pairs of nut and bolt assemblies (not shown) to be primarily used in securing the first and second flange members 10, 12 together. It is preferred that the jack bolt assembly A of the present invention be used in lieu of two of such nut-bolt assemblies, with two complete jack bolt assemblies A being mountable with the flange assembly such that they are 180° apart. The jack bolt assemblies A are adapted to be used to both connect the flange members 10, 12 as well as separate the connected flange members 10, 12 when removal is desired. Typically, such separation requires considerable force and is somewhat difficult in the accomplishment thereof. By utilization of the jack bolt assembly A of the present invention, such procedure is not only simplified, but also made more effective and requires less additional tools for doing same. Any number of jack bolt assemblies A may be used in lieu of conventional bolt-nut arrangements, but it is preferred that such be evenly disposed about the perimeter of the flange ring of the flange assembly F. For example, of three such jack bolt assemblies A were to be used, they should be spaced at 120° intervals about the flange assembly F; if four should be used, then such should be spaced at 90° intervals about the flange assembly F, and so forth. This enhances the ability to provide a substantially equal, coordinated separating force to be exerted by the jack bolt assembly A during the spreading apart of the mating flange members 10, 12, as discussed more fully hereinbelow.

As shown in FIG. 1A, the jack bolt assembly A is preferably mounted with the flange assembly F such that the primary threaded portion P is threadedly received in a suitably formed threaded opening 10j formed in the first flange member 10, with the thrust member M disposed between the inner radial flange ring surfaces 10d, 12d of the flange members 10, 12, respectively, while the receiving portion 20 and secondary threaded portion 22 extend thereinto and through the opening 12j formed in the second flange member 12. A suitable securing member 24 is threadedly received on the secondary threaded portion 22 and allows for proper make-up of the first and second flange members 10, 12 upon proper tightening of the securing member 24 on the secondary threaded portion 22. In such a tightened configuration, the thrust member M may be loosely disposed within the cavity formed by the inner radial flange ring surfaces 10d, 12d and inner annular surface 10c, 12c. Thus, tightening of the securing member 24 results in conventional tightening of the flange members 10, 12 for proper make-up operations. As a result, each jack bolt assembly A is in place with the flange assembly F and is available for use at any time when it becomes necessary to spread the first and second flange members 10, 12 with respect to one another.

Upon the need arising for separating the flange members 10, 12, for example, to replace or rotate the member 14, all conventional bolt-nut assemblies should be loosened and removed. Thereafter, tool 27 should be placed in engagement with the tool engaging adapter E. By proper rotations of the tool engaging adapter E and thus rotation of the jack bolt member J, the thrust member M abutts the radial engaging surface R adjacent the second end 16c of the threaded portion 16, thus forcing the thrust member M to the right as viewed in FIG. 1. Continued rotation of the jack bolt member J by the tool engaging the tool engaging adapter E results in the thrust member M engaging the inner radial flange ring surface 12d of the second flange member 12 with there being full-face contact therebetween. Continued rotation results in the thrust member M moving to the right as viewed in FIG. 1 for exerting a separating force on the second flange member 12 with respect to the first flange member 10. Continued rotation of the threaded portion 16 with respect to the threaded opening 10j results in continued loading on the thrust member M by virtue of the action between the radial engaging surface 18 of the jack bolt member J acting upon the thrust member M, through the thrust member M to act upon the second member 12 for separating the second flange member 12 from the first member 10 to effectuate the jacking apart of the flange members 10, 12. Of course, as multiple jack bolt assemblies A are used in jacking apart the flange assembly F, it is desired that there be some uniformity in the application of the jacking force such that partial jacking forces should be somewhat equally applied by all jack bolt assemblies for insuring proper, aligned separation of the flange members 10, 12.

As shown in FIG. 1, it is preferred that the receiving portion 20 and secondary threaded portion 22 be of a diameter slightly less than that of the opening 12j such that it may perform the function of an ordinary, conventional bolt when not used in separating operations, but for enhanced ease of use during normal securing operations. As such, it is to be noted that in the event that it is desired that the tightening and loosening operations all be accomplished with one tool 27, such should be sized such that the tool faces 27a thereof may engage and rotate not only the tool engaging adapter E but also the securing member 24 (FIG. 1).

Thus, it will be appreciated that the jack bolt assembly A of the present invention may be adapted to be used on any existing flange by merely threading the flange openings (i.e., opening 10j) in such a manner that they may compatibly receive the primary threaded portion P of the jack bolt member J. In most cases, the jack bolt assembly A of the present invention may be retrofit on existing flanges without disrupting service or causing shutdowns. Thus, the jack bolt assembly A of the present invention provides a dual purpose, in that it is capable of being used not only to secure together first and second flange members 10, 12 of a flange assembly F, but also to be used in supporting, aligning and separating the mating flange members 10, 12. Typically, it is not uncommon for flange members 10, 12 to be misaligned, either axially, radially, or otherwise, when disassembled, with potentially dangerous misaligning forces capable of injury to operating personnel. However, the jack bolt assembly A of the present invention permits loosening or tightening operations to easily and safely proceed without undue risks to the operations due to such misalignment forces.

As best seen in FIG. 3, the jack bolt assembly A of the present invention may be used in conjunction with spectacle blind 15. Assuming that the flange members 10, 12 have been made up as shown in FIG. 1A, the first step is to remove all conventional bolt/nut assemblies (not shown) securing the flange members 10, 12 of the flange assembly F together, thus resulting in the removal of all such nut/bolt assemblies from openings 12j. In this manner, the jack bolt assembly A of the present invention may preferably be positioned 180° apart from one another, which is shown in FIG. 3 at the twelve o'clock and six o'clock positions and labeled jack bolt assemblies 50, 52 respectively. After all conventional bolt/nut assemblies have been removed from openings 12j, tool 27 engages securing members 24 for loosening thereof and thereafter engages tool engaging adapter E to effectuate rotation of the jack bolt member J. Such rotation results in the thrust bushing 28 separating flange members 10, 12. Upon suitable separation of the flange members 10, 12, the gaskets 14g may be removed and the spectacle blind 15 is merely rotated about the jack bolt assembly 52 extending through the opening 15e in the neck 15d of the spectacle blind 15 (that is, the jack bolt assembly A in the six o'clock position as shown in FIG. 3). Thus, the spectacle blind 15 may be rotated from a position wherein the flowline is blocked by the flowline closing blind portion 15c, to a position where the flowline is open such that open blind portion 15a and the bore 15b of spectacle blind 15 are properly aligned with the axial bores 10a, 12a of the flange members 10, 12. It should be appreciated that the outer annular surfaces 15f, 15g of the spectacle blind 15 are slightly less in diameter than the diameter of an imaginary circle defined by the innermost portion of the openings 12j, such that a clearance 40 exists between the opening 12j and the outer annular surface 15f, 15g of the spectacle blind 15. The gaskets 14g are similarly sized. Furthermore, it should be appreciated that the outer annular surfaces 15f, 15g of the blind 15 is radiused at each end portion 15h, 15i, respectively, to permit rotation of the blind 15 about the jack bolt assembly 52 positioned within opening 15e in the neck 15d of the blind 15. After rotating the blind 15 approximately 180°, the close proximity of the clearance 40 (enlarged for purposes of illustration) permits the accurate indexing of either portion of the spectacle blind 15 with respect to the flange members 10, 12 of the flange assembly F. After the blind 15 has properly been repositioned and a new pair of gaskets 14g properly placed, thereafter the conventional bolt/nut assemblies may be reinserted into openings 10j, 12j for resecuring the flange members 10, 12 together along with action of the securing member 24 fo the jack bolt assembly A. It should be apparent that the opening 15e formed in the neck 15d of the spectacle 15 is of such a diameter to permit the thrust member M to move through the opening 15e for engagement with the radial surface 12d of flange member (FIG. 1B). Furthermore, it should be noted that the outside diameter of the thrust member M is preferably greater in dimension than that of the primary threaded portion P such that there is a suitable clearance 45 (FIG. 1B) between the primary threaded portion P and the opening 15e formed in the spectacle blind 15. This clearance 45 ensures non-interference of the primary threaded portion P with the pivoting of the spectacle blind 15 about the jack bolt assembly 52.

It will be appreciated that the tool engaging adapter E is so sized that not only it and the securing member 24 may be suitably rotated by the same tool 27 for appropriate action of the jack bolt assembly A. Also, upon damage to the tool engaging adapter E, such may be easily replaced without discarding the entire jack bolt member J nor requiring the removal thereof from service. Furthermore, the securing member 31 retains the tool engaging adapter E with the jack bolt member J, yet permits ease of removal of the tool engaging adapter E as desired.

Thus, the jack bolt assembly A of the present invention provides a new and improved apparatus capable of not only being used for securing together flange members 10, 12 of a flange assembly F but also capable of being used for the efficient separation, alignment, and support of mating flange members 10, 12 of a flange assembly F upon disassembly thereof.

The foregoing disclosure and description of the invention are illustrative and explanatory thereof, and various changes in the size, shape and materials, as well as in the details of the illustrated construction may be made without departing from the spirit of the invention.

I claim:

1. In a releasable flange assembly of the type having first and second flange members each adapted for attachment to make-up end portions of first and second flowlines, respectively, with the releasable flange assembly joining the first flowline in fluid communication with the second flowline when the first and second flange members are secured in a make-up union, fluid communication between the first and second flowlines being interrupted when the flange members are spread, the first and second flange members each having a corresponding number of aligned openings for receiving tightening bolts, at least one of the aligned openings in the first flange member being threaded, the improvement comprising a jack bolt assembly received in an aligned pair of flange openings for securing, separating and aligning the flange members during make-up and spread operations, said jack bolt assembly having:

a primary threaded shaft portion for threadedly engaging the threads in at least one of the openings formed in the first flange member;

a tool engaging end formed with said primary threaded shaft portion for rotation of said threaded shaft portion as desired;

a radial engaging surface formed adjacent said primary threaded shaft portion, said radial engaging surface extending radially inwardly from said primary threaded shaft portion;

a thrust member receiving portion formed adjacent to said primary threaded shaft portion and said radial engaging surface, said thrust member receiving portion being aligned with said primary shaft portion and adapted to extend into the aligned opening formed in the second flange member;

a secondary threaded portion formed adjacent to and in axial alignment with said thrust member receiving portion and adapted to be disposed within the opening formed in the second flange member and adapted to extend outwardly therefrom;

a thrust member movably mounted on said thrust member receiving portion, said thrust member being disposed between the first and second flange members of the flange assembly, said thrust member abutting said radial engaging surface and the second flange member upon initial rotation of said primary threaded shaft portion, the engagement of said thrust member with the second flange member separating the first and second flange members of the flange assembly upon the continued rotation of said primary threaded portion;

a securing member threadedly engaging said secondary threaded portion, said securing member releasably abutting the second flange member of the flange assembly for releasably securing the second flange member with the first flange member of the flange assembly upon threaded, tightening action between said securing member and the second flange member; and, a tool engaging adapter mounted with said tool engaging end for rotation in engagement with said tool engaging end.

2. The improvement as defined in claim 1, wherein:
said thrust member includes a thrust bushing.

3. The improvement as defined in claim 1, wherein:
said tool engaging adapter is formed having a geometric bore for compatibly engaging the geometric exterior annular surface of said tool engaging end.

4. The improvement as defined in claim 1, wherein:
said tool engaging adapter is of the same exterior annular surface configuration and cross-sectional radial dimension as said securing member.

5. The improvement of claim 1, wherein:
said tool engaging adapter is releasably mounted with said tool engaging end.

6. The improvement of claim 1, further including:
an adapter securing member adapted to be mounted with said tool engaging end for releaseably securing said tool engaging adapter with said tool engaging end.

7. The improvement of claim 6, wherein:
said tool engaging end is formed having an annular recess for receiving said adapter securing means, said adapter securing means preventing said tool engaging adapter from separating from said tool engaging end.

8. The improvement of claim 7, wherein:
said adapter securing means includes a snap ring adapted to be received within said annular recess.

9. The improvement of claim 1, wherein:
the outside diameter of said thrust member is greater in dimension than the outside diameter of said primary threaded portion.

10. In a releasable flange assembly of the type having first and second flange members each adapted for attachment to make-up end portions of first and second flowlines, respectively, with the releasable flange assembly joining the first flowline in fluid communication with the second flowline when the first and second flange members are secured in a make-up union, and fluid communication between the first and second flowlines being interrupted when the flange members are spread, the first and second flange members each having a corresponding number of aligned openings for receiving tightening bolts, at least one of the aligned openings in the first flange member being threaded, the improvement comprising a jack bolt assembly received in an aligned pair of flange openings for securing, separating and aligning the flange members during make-up and spread operations, said jack bolt assembly having:

a primary threaded shaft portion for threadedly engaging the threads in at least one of the openings formed in the first flange member;

a tool engaging end formed with said primary threaded shaft portion for rotation of said threaded shaft portion as desired;

a radial engaging surface formed adjacent said primary threaded shaft portion, said radial engaging surface extending radially inwardly from said primary threaded shaft portion;

a thrust member receiving portion formed adjacent to said primary threaded shaft portion and said radial engaging surface, said thrust member receiving portion being aligned with said primary shaft portion and adapted to extend into the aligned opening formed in the second flange member;

a secondary threaded portion formed adjacent to and in axial alignment with said thrust member receiving portion and adapted to be disposed within the opening formed in the second flange member and adapted to extend outwardly therefrom;

a thrust member movably mounted on said thrust member receiving portion, said thrust member being disposed between the first and second flange members of the flange assembly, said thrust member abutting said radial engaging surface and the second flange member upon initial rotation of said primary threaded shaft portion, the engagement of said thrust member with the second flange member separating the first and second flange members of the flange assembly upon the continued rotation of said primary threaded portion;

a securing member threadedly engaging said secondary threaded portion, said securing member releasably abutting the second flange member of the flange assembly for releasably securing the second flange member with the first flange member of the flange assembly upon threaded, tightening action between said securing member and the second flange member; and, a spectable blind adapted to be disposed between the first and second flanges;

said spectacle blind having an open flowline blind portion and a flowline closing blind portion joined at a neck portion;

said neck portion receiving said thrust member in a neck opening formed therein; and, said spectacle blind adapted to rotate about said thrust member when the first and second flanges are separated and said jack bolt member in position therewith.

11. The improvement of claim 10, wherein:

the outside diameter of said thrust member is greater than the outside diameter of said primary threaded shaft portion to provide a clearance between said primary threaded shaft portion and said neck opening to enhance ease of rotation of said spectacle blind and to prevent damage to said primary threaded shaft portion.

12. The improvement of claim 10, wherein:

the extremities of the end portions of said open flowline blind portion and said flowline closing blind portion are each radiused to permit rotation of said spectable blind about said jack bolt member.

* * * * *

UNITED STATES PATENT AND TRADEMARK OFFICE
CERTIFICATE OF CORRECTION

PATENT NO.  : 4,671,324
DATED       : June 9, 1987
INVENTOR(S) : David C. Neill

It is certified that error appears in the above-identified patent and that said Letters Patent is hereby corrected as shown below:

Column 1, Line 55, "fa_sr_" should be -- far --.

Column 5, Line 60, "_o_f" should be -- _i_f --.

Column 8, Line 8, "fo" should be -- of --.

Column 8, Line 13, "flange member (FIG. 1B)." should be -- "flange member _12_ (FIG. 1B). --.

Column 8, Line 55, "union, fluid" should be -- union, _and_ fluid --.

Signed and Sealed this

Third Day of November, 1987

Attest:

DONALD J. QUIGG

Attesting Officer

Commissioner of Patents and Trademarks